(12) United States Patent
Iannone

(10) Patent No.: US 7,724,926 B2
(45) Date of Patent: May 25, 2010

(54) FOSTER CARE MONITORING AND VERIFICATION DEVICE, METHOD AND SYSTEM

(76) Inventor: Mary A. Iannone, 5929 16th Ave. SW., Seattle, WA (US) 98106

( * ) Notice: Subject to any disclaimer, the term of this patent is extended or adjusted under 35 U.S.C. 154(b) by 1166 days.

(21) Appl. No.: 11/226,835

(22) Filed: Sep. 14, 2005

(65) Prior Publication Data

US 2006/0056665 A1    Mar. 16, 2006

Related U.S. Application Data

(60) Provisional application No. 60/610,114, filed on Sep. 15, 2004.

(51) Int. Cl.
*G06K 9/00* (2006.01)
*G06K 9/68* (2006.01)
(52) U.S. Cl. ........................ 382/124; 382/218
(58) Field of Classification Search .............. 382/115, 382/124, 117, 209, 218, 219, 116, 118–123, 382/125–127; 340/5.53, 5.8, 5.81, 5.82, 340/5.83, 5.84; 713/186; 902/3
See application file for complete search history.

(56) References Cited

U.S. PATENT DOCUMENTS

| | | | | |
|---|---|---|---|---|
| 6,373,967 | B2 * | 4/2002 | Pu et al. ..................... | 382/115 |
| 6,393,139 | B1 * | 5/2002 | Lin et al. ..................... | 382/124 |
| 6,697,947 | B1 * | 2/2004 | Matyas et al. ................ | 713/182 |
| 6,928,546 | B1 * | 8/2005 | Nanavati et al. ............. | 713/186 |
| 6,957,339 | B2 * | 10/2005 | Shinzaki ..................... | 713/186 |
| 7,130,452 | B2 * | 10/2006 | Bolle et al. ................. | 382/115 |
| 7,209,886 | B2 * | 4/2007 | Kimmel ......................... | 705/3 |
| 7,222,241 | B2 * | 5/2007 | Milgramm et al. .......... | 713/186 |
| 2002/0030582 | A1 * | 3/2002 | Depp et al. ................ | 340/5.53 |
| 2003/0093298 | A1 * | 5/2003 | Hernandez et al. ............ | 705/2 |
| 2003/0156740 | A1 * | 8/2003 | Siegel et al. ................ | 382/115 |
| 2005/0038675 | A1 * | 2/2005 | Siekman et al. ............... | 705/2 |
| 2005/0174242 | A1 | 8/2005 | Cohen | |

OTHER PUBLICATIONS http://world.casio.com/me-africa/news/2003/fingerprint.html.

* cited by examiner

*Primary Examiner*—Daniel G Mariam
(74) *Attorney, Agent, or Firm*—David W. C. Chen; DWC Law Firm, P.S.

(57) ABSTRACT

In some embodiments, system, devices and methods for monitoring and verifying foster care placement and processes are provided, the system and devices including a fingerprint scanner configured with limited function keys to limit data tampering opportunities for users, with the fingerprint scanner having a capability to associate fingerprint images within categories including clients, staff and providers, and also having the capability to group fingerprint images into visitation sets of data, and software for monitoring the visitations by staff members with providers and clients using fingerprint images obtained using the fingerprint scanner.

11 Claims, 7 Drawing Sheets

Visit Exception Report - 6/30/2004

| Client | Assigned Staff | OOH Provider | Last Visit | Days past Compliance |
|---|---|---|---|---|
| | ~40 | ~42 | ~44 | ~46 | ~48 |
| Winter, Wilma | Helper, Helen | Foster, Frank | 5/20/2004 | 10 |
| Spring, Samuel | Helper, Helen | Goody, Alice | 5/17/2004 | 13 |
| Summer, Sharon | Pendant, Cody | Centering Group Home | 5/10/2004 | 20 |

Missing Image Report 6/30/2004

| Client | Assigned Staff | OOH Provider | Visit Date |
|---|---|---|---|
| Fall, Freddy | Pendant, Cody | | |

FOSTER CARE MONITORING AND VERIFICATION DEVICE, METHOD AND SYSTEM

CROSS-REFERENCE TO RELATED APPLICATION(S)

This application claims the benefit of U.S. Provisional Patent Application No. 60/610,114 filed Sep. 15, 2004, which is incorporated herein by reference in its entirety.

BACKGROUND

1. Field of the Invention

The present invention relates generally to foster care and child protective services monitoring and verification methods, systems, and apparatus.

2. Description of Related Art

Although procedures for child welfare systems vary from state to state, every department of Child Protective Services (CPS) relies upon caseworkers. After an initial report of abuse or neglect is made to CPS and an investigation determines that the report is substantiated, a child may be left in the care of his or her family, moved to a shelter or group home, or placed in the care of a relative or foster family. CPS's designation of a care provider is, in part, based on likelihood of future abuse or neglect. Therefore the safety of the child, not to mention potential liabilities for any harm to the child, can depend on how the placement or designation proceeds and the monitoring thereof afterwards.

To verify the presence of both the child and the designated care provider, and to monitor a placement or the progress of a care provider designation, caseworkers are normally required to perform regular visits that can sometimes be unannounced. This can be an effective tactic in objective monitoring and gathering of desired information, and furthermore, a care provider's or caseworker's awareness of this tactic can help deter wrongdoing. While recognizing the thousands of highly competent and caring caseworkers and providers, it is nonetheless unfortunate that some individuals are known to have manipulated or forged information or visitation records, resulting in tragic consequences or reducing the integrity of the system in general. There is also a danger that inexperienced or overworked caseworkers may misidentify children or designated care providers. Whether intentional or not, failure to accurately verify a child's placement and monitor it according to applicable policies or law, can undermine a child welfare system's primary goal—the safety and well being of its clients.

The US DHHS estimates that in the year 2002 alone, over a quarter of a million children were removed from their homes as a result of an abuse or neglect investigation. Furthermore, in the United States, it is estimated that about 542,000 children are in foster care on any given day, and more than 700,000 children live in government-run foster care each year. Nearly half of all children in foster care are over the age of 10 and about 32 percent remain in the system for more than three years. It is also notable that about 903,000 children and youth were confirmed victims of abuse and neglect in the United States in 2001. Clearly, it is desirable that an invention be disclosed that would increase the ability of child welfare systems to gather, evaluate and verify information reliably and accurately for the benefit of the public and its clients.

BRIEF SUMMARY OF THE INVENTION

Various embodiments of the present invention comprise a fingerprint scanner and compatible software used within a computer system, the computer system being coupled to a database. The fingerprint scanner can also comprise a camera or wireless communications capabilities.

In some embodiments of the present invention, child welfare agencies involved in placing children with care providers, are required to establish baseline sets of data for new placements, which can include, without limitation, scanned fingerprint images for the parties related to the new placement. The camera of the fingerprint scanner can also be utilized to capture pictures of the parties to be used as a compliment, or independently of, a fingerprint image to provide additional information. The parties can include the client (whom is normally a child), a care provider (whom is normally one or more adults) and an assigned caseworker.

The baseline set of data can be created in conjunction with the process of creating and responding to intake reports using software within a computer or, in some embodiments, software within a main computer system that is accessed via terminals.

As will be understood by one skilled in art after reviewing this disclosure, after an intake is complete, and a baseline set of data is established for the intake, the software can be used to monitor and verify the placement. This can comprise using the fingerprint scanner to scan fingerprints of the assigned caseworker, provider and client during visitations, both in the office of the caseworker and in the field. The scanned fingerprints during each visitation can be associated together as a visitation set of data, which can include associated date & time stamps (as used herein, a "time stamp" can refer to both a date & time stamp) for each fingerprint scanned, and additional identifiers, such as sequence numbers, or other unique identifying data, associated with each fingerprint image generated and stored within the fingerprint scanner. Each visitation set of data can be transferred of uploaded from the fingerprint scanner into the computer system to be evaluated by the methods and systems of the present invention, including generating reports based on comparing the visitation sets to preprogrammed requirements within the software to provide information as to whether visitations are being properly carried out. The scanned images combined with their time stamps can thus be used as a verification to compliment existing methods of monitoring placements, to verify that visitations were indeed conducted and that the parties involved (case worker, client and provider) match the parties that were assigned during placement, and that the fingerprint images were scanned during the date/time of the visitation. In some specific examples, the software can be used as a compliment for monitoring and evaluating whether actual time periods between visits are conducted in accordance with applicable laws, polices or agency requirements. Again, the existence of images (e.g. fingerprint images) associated with the visits serve as additional verification that visits actually occurred, and that all parties to the placement were actually present during such visits. In other embodiments, the software or application programs of the present invention can be primary monitoring systems that incorporate or have some components that are equivalents to existing monitoring methods. Therefore, the software can serve as the primary method of monitoring placements, having an integrated verification system utilizing the scanned fingerprint images. As will be appreciated by one skilled in the art, these various embodiments of the present invention may help mitigate risk for the agencies by providing monitoring and verifications methods that can be substantially more self automating and substantially more tamper resistant than current methods.

DETAILED DESCRIPTION OF PREFERRED EMBODIMENTS

In the following description, certain specific details are set forth in order to provide a thorough understanding of various embodiments of the invention. However, upon reviewing this disclosure one skilled in the art will understand that the invention may be practiced without many of these details. In other instances, well-known structures associated with biometric finger print devices, digital cameras, wireless communications devices and associated hardware and software have not been described in detail to avoid unnecessarily obscuring the descriptions of the embodiments of the invention.

Throughout various portions of the following description, the embodiments of the present invention are described in the context of use for monitoring and implementing child placement and care in a child welfare system. However, as will be understood by one skilled in the art after reviewing this disclosure, various embodiments of the present invention may have a wide variety of applications, including in other human service delivery contexts where effective monitoring of services is required, and the description is not intended to be restrictive unless otherwise indicated.

The term "intake" as used herein, is intended to include all types of intake procedures implemented by foster care agencies or organizations, or related agencies or organizations, for the purpose of collecting information for the determination of proper placement and monitoring thereof. In the following disclosure, a personal computer is graphically illustrated in the figures and is intended to also represent various optional and related devices and systems, such as, inter alia, laptops, mainframes, servers and the equivalents thereof, along with associated systems such as databases and memory systems. Whenever the term "computer" is used herein, it is also intended to include mainframes, servers, laptops, personal computers, and associated memory system and database and other devices and systems capable of processing or storing information, unless the context indicate otherwise.

Figure 2:
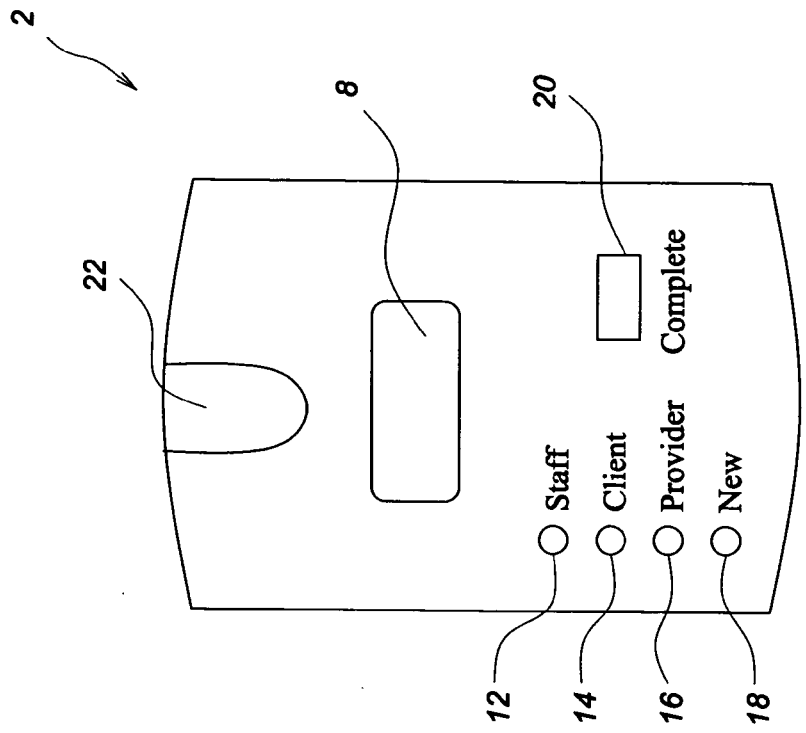
FIG. 2 is an overhead plan view of an embodiment of the fingerprint scanner of the present invention.
Figure 1:
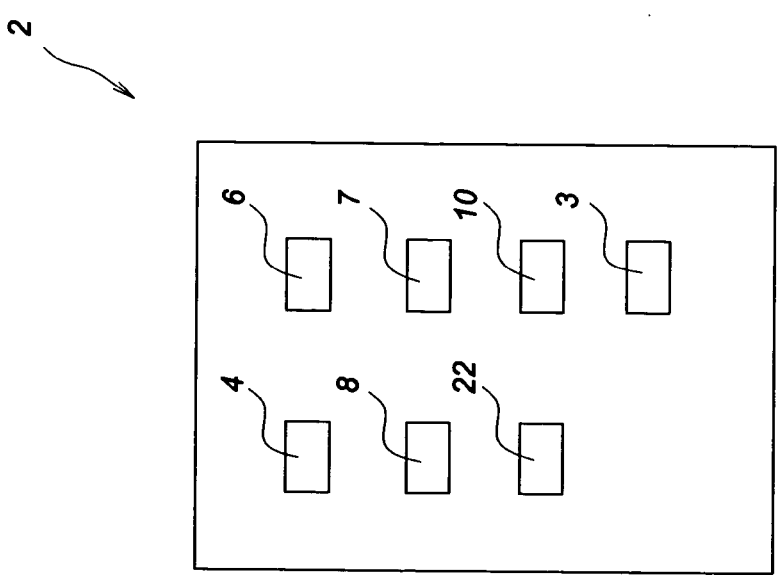
FIG. 1 is a simplified block diagram of an embodiment of the fingerprint scanner of the present invention.

As best seen in FIGS. 1 & 2, some embodiments of the present invention include one or more fingerprint scanners 2 for scanning fingerprints of caseworkers, clients (i.e., children) and care providers (i.e., adult care providers for the clients). As will be appreciated by one skilled in the art after reviewing this disclosure, fingerprint scanning technology is currently available and in use in various fields and for a myriad of purposes. However, the fingerprints of children can require higher-resolution scanning. Nonetheless, some widely available fingerprint scanning technology is capable of reliably scanning fingerprints of children. For example, ULTRA SCAN CORPORATION has developed a line of high-resolution ultrasonic fingerprint scanners designed to be capable of reliably scanning fingerprints of younger children under 5 years of age, having resolution up to 1000 dpi and a scan area from 0.5".times.0.7", for a single finger, up to 0.8".times.1.2". Without being bound by theory, a plurality of lower resolution fingerprint scanners are also available, which may be adequate for some applications and methods disclosed herein, however, in some preferred embodiments of the present invention, the available higher-resolution scanning technologies are employed for improved reliability in scanning the finger prints of younger children. In some embodiments of the present invention, the fingerprint scanner 2 can be less than about 4 inches wide, as measured laterally from a side edge to the opposite side edge, along the width of the fingerprint scanner 2 shown in FIG. 2, and less than about 6 inches in length, as measured longitudinally from the top edge to the bottom edge on the fingerprint scanner 2 shown in FIG. 2.

Again referring to FIGS. 1 & 2, the fingerprint scanner 2 can have a controller 4, such as a microcontroller or processor, connected to one or more memory systems 6 and a display 8, which can be a liquid crystal display, LED or other indicator light. Also, a scanning element 22 is provided for scanning fingerprints. The memory systems 6 can include one or more memory sections, with the one or more sections including volatile (e.g. RAM) and non-volatile memory, with a writable non-volatile memory 7 and read only memory. Also, an oscillator 10 can be provided within the fingerprint scanner 2 to keep time or be used to produce date and time stamp signals. The date and time stamp signals can be stored in the writable memory sections 7, as date and time stamp data associated with unique fingerprint data or images collected by the fingerprint scanner 2. Furthermore, the date and time stamp signals, may be converted to characters to be displayed by the display 8 (e.g., when the display 8 is a LCD), alone or with other information.

In further embodiments of the present invention, the fingerprint scanner 2 can include a camera system 3 which can be a digital camera (or a traditional camera incorporating a film compartment). As will be appreciated by those skilled in the art after reviewing this disclosure, compact digital photography devices are widely available for use in combination with various embodiments of the present invention.

Input elements 10 can be provided to allow users to initiate signals to various sections of the fingerprint scanner 2, such as to the controller 4, to store and associate image information with time stamps and to associate the stored images and time stamps within particular groupings, such as visitation sets (as discussed below) and with unique identification tags or sequence numbers. As will be understood by one skilled in the art after reviewing the present disclosure, the various elements described above can be employed in a variety of combinations to implement various embodiments of the invention as disclosed herein.

The fingerprint scanner 2 can be configured to resist data tampering or manipulation. As shown in FIG. 2, some embodiments of the fingerprint scanner 2 have limited numbers of actuating members 12, 14, 16, 18 and 20 (e.g., function keys, or buttons) which can be depressed by a user to actuate one or more of the input elements 10. The actuating members 12, 14, 16, 18, and 20 can be labeled "Staff," "Client," "Provider," "New," and "Complete," respectively, as seen in FIG. 2. As will become apparent to one skilled in the art as this disclosure progresses, the absence of other actuating members and input elements that could otherwise be provided for more flexible control of the fingerprint scanner 2 can help reduce the possibility of data tampering.

Intake processes for a new placement within certain embodiments of the present invention can require the procurement of baseline fingerprint images for all parties relevant to the placement. This can comprise collecting fingerprint images for the provider, the client, and the caseworker. The established baseline data, or baseline images, can then be used for monitoring the placement. For example, in some child welfare system scenarios, caseworkers are required to conduct "out of office" or field or "OOO" visitations, to the homes or sites of assigned care providers to monitor care or verify placement. The caseworker can be required by a child welfare system (hereinafter "CWS") agency, to carry the fingerprint scanner 2 to each and every field visit. During the field visit, the caseworker can record information using the fingerprint scanner 2.

This process can have the following steps:
(1) The caseworker activates or turns-on the fingerprint scanner 2 by pressing a power up switch located thereon.
(2) The caseworker depresses actuating member 12, labeled as "Staff" in FIG. 2, then scans her or his own fingerprint into the fingerprint scanner 2 by placing the caseworker's finger on the scanning element 22.
(3) The fingerprint scanner 2 scans the caseworker's fingerprint, and stores an image generated therefrom into the writable memory 7, and further associates that image with a time stamp, reflecting the current date and time of the scan.
(4) In some embodiments, steps (2) and (3) are repeated as necessary to scan the fingerprints of any number of caseworkers present or responsible for the particular visit.
(5) The caseworker depresses actuating member 16, labeled as "Provider" in FIG. 2, and instructs a care provider in the home to place her or his fingers on the scanning element 22.
(6) The fingerprint scanner 2 scans the provider's fingerprint, and stores an image generated therefrom into the writable memory 7, and further associates the image with a time stamp, reflecting the current date and time.
(7) Steps (5) and (6) are repeated as necessary to scan the fingerprints of any number of providers present in a particular visit.
(8) The caseworker then depresses actuating member 14, labeled as "Client" in FIG. 2, and instructs or aids, or instructs the care provider to aid, the client—which is a young child in some scenarios—to place the client's finger on the scanning element 22.
(9) The fingerprint scanner 2 scans the client's fingerprint, and stores an image generated therefrom into the writable memory 7, and further associates the image with a date and time stamp, reflecting the current date and time.
(10) Steps (8) and (9) are repeated as necessary to scan the fingerprints of any number of clients present during the particular visit.
(11) When the caseworker has captured all required finger prints, namely that of any providers and clients present, the caseworker can depress actuating member 20, labeled as "Complete" in FIG. 2, which can cause a signal to be sent to the fingerprint scanner 2 controller, indicating that all of the prior data and images collected in the above steps should be grouped as a single visitation set within the writable memory 7.

Figure 4A:
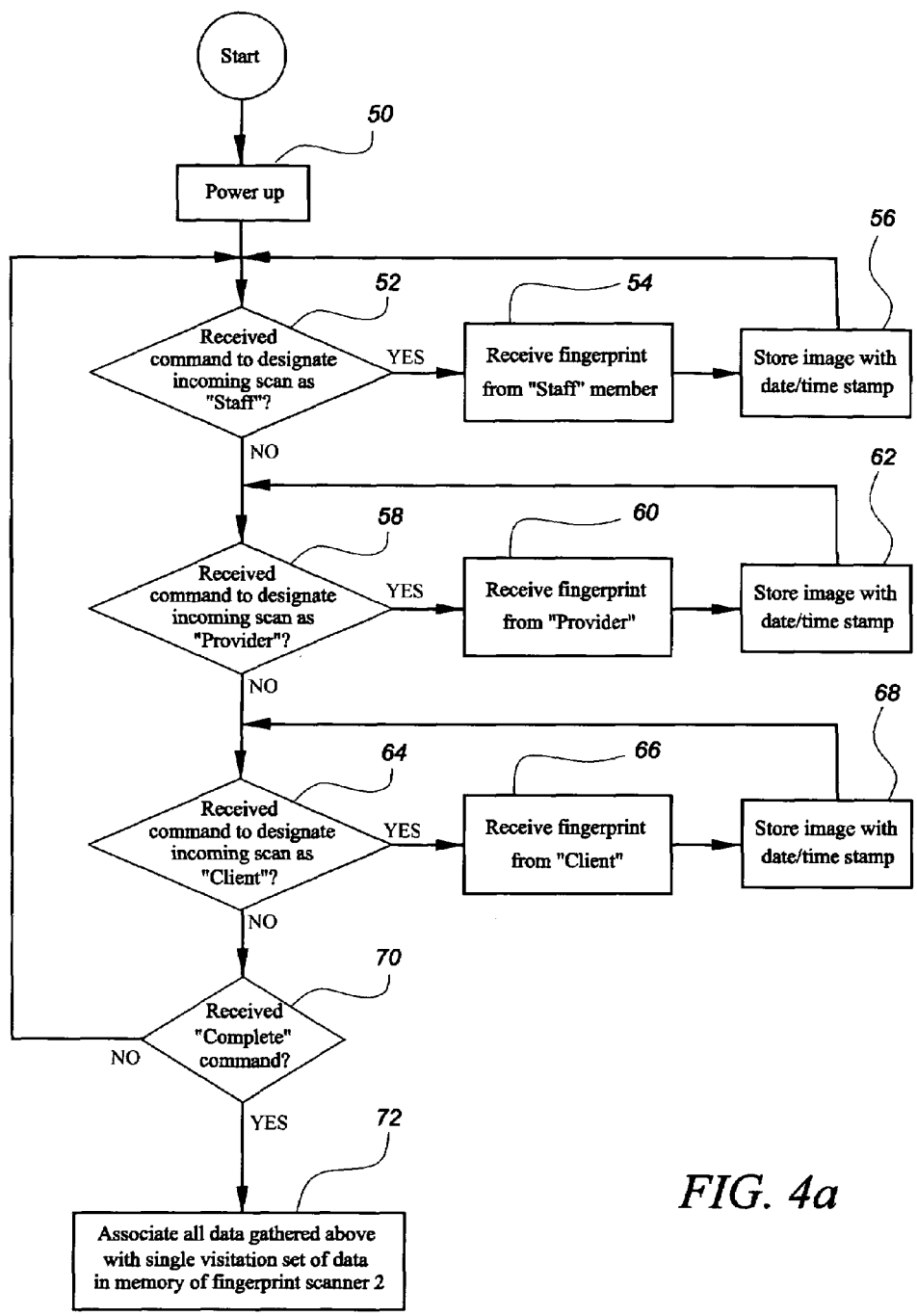
FIG. 4a is a flow chart of an embodiment of the present invention usable for gathering and associating fingerprint images into visitation sets of data, using the fingerprint scanner of FIG. 2.
Figures 5A, 5B, 6:
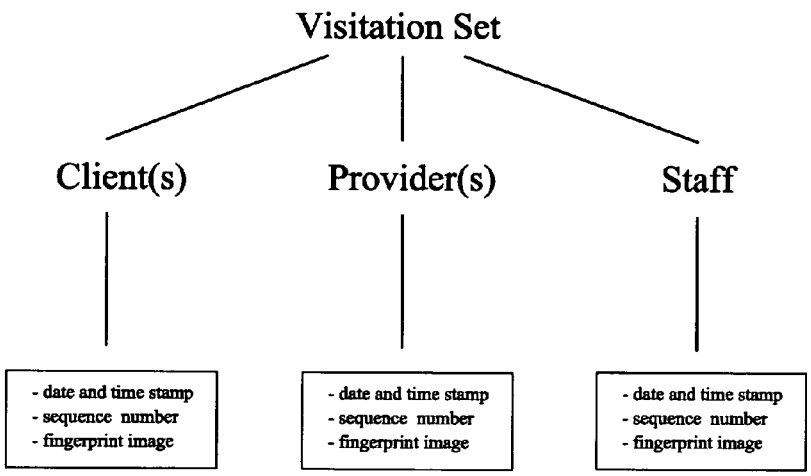
FIG. 5a is an embodiment of an Exception Report for the present invention.
FIG. 5b is an embodiment of a Missing Image Report for the present invention.
FIG. 6 is a data association diagram for some embodiments of the present invention.

FIG. 4a shows a flow chart for a process occurring within an embodiment of the fingerprint scanner 2, when steps (1) through (11) above are implemented. That is, at step 50, the fingerprint scanner is powered (unless previously powered up). At step 52, the fingerprint scanner 2 can receive a command or input to designate an incoming fingerprint scan or image, as a "staff" image. At step 54, a fingerprint image is received. At step 56, the image is stored with an associated date and time stamp, and in some embodiments, is also associated with a sequence number. Also, steps 58, 60, 62, 64, 66, and 68, allow the fingerprint scanner 2 to receive commands to designate other incoming fingerprint images as "provider" or "client" images, and to also store them with associated date and time stamps. At step 70, the fingerprint scanner 2 can receive a "complete" command, which causes it to associate all images and data gathered since step 52 within a single visitation set of data, for a particular visit. As will be appreciated by those skilled in the art after reviewing this disclosure, and as reflected in FIG. 4a, the data collection from "staff," "client," or "provider," can occur in various orders, depending on the embodiments of the present invention and what may be appropriate for a particular circumstance. Referring to FIG. 6, each visitation set of data collected can include fingerprint images with associated time stamps and sequence numbers for each client, provider and staff member.

As described above, in some embodiments, in addition to associating each of the images generated in any and all of the steps above with unique date and time stamps, the fingerprint scanner 2 also associates a sequence number to each image generated. A sequence number can provide a unique identification of each particular image, and its associated date and time stamp, for the purpose of identifying, sorting and processing the image, as will be appreciated by those skilled in the art. Also, as noted above, a user depressing member 20 (e.g., "Complete") can cause the data collected within a single visit to be grouped into an associated "visitation set." As will be understood by those skilled in the art after reviewing this disclosure a variety of methods are available to create such grouping or association between various data components. By grouping the data within visitations sets, information is provided which can be use to determine or verify who was present at a particular visit.

The method steps and apparatus implemented in the embodiment of the invention disclosed above for OOO visits, can also be applied in whole, or in part, to "in office visits," where one or more clients and their designated providers visit a caseworker's office. For example, the caseworker can create a visitation set of data during an "in office visit" by executing steps (1) through (11) with the visiting clients and providers. In the alternative, steps (1) through (10) can be implemented, while the final step (11), for completing data acquisition during a visit, may be implemented by another device or system, by coupling the fingerprint scanner 2 to the other device or system, such as a computer 28. Once coupled to the computer 28, the collected data can be uploaded into the computer 28 and associated together as a visitation set using an application program (i.e. software) or application program component executed by the computer 28.

Figure 3A:
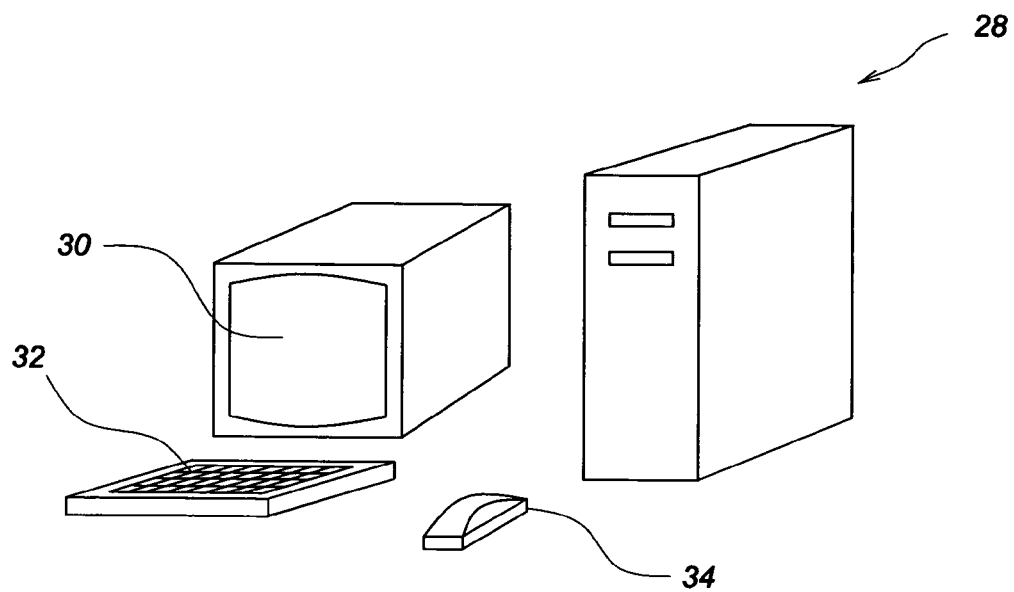
FIG. 3a is a perspective view of a computer system for use with some embodiments of the present invention.
Figure 3B:
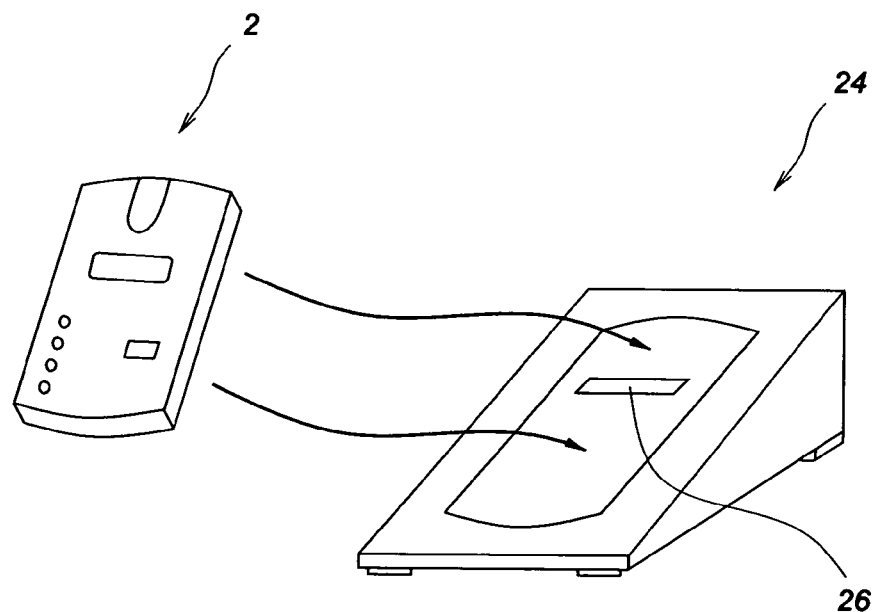
FIG. 3b is a perspective view of an embodiment of a docking station for the fingerprint scanner of FIG. 2.

Some embodiments of the present invention that allow the fingerprint scanner 2 to be coupled to a computer 28 are illustrated in FIGS. 3*a* & 3*b*, showing that the fingerprint scanner 2 can be connected to a docking station 24 via a connection port 26 that allows communication through the docking station 24 to a computer 28, such as a desktop computer, laptop or central mainframe (not graphically illustrated).

In other embodiments of the present invention, the caseworker uses the fingerprint scanner 2 during emergency placements. For example, without limitation, if a potential child abuse circumstance is reported to an agency, a caseworker can bring the fingerprint scanner to meet the client. In such circumstances, the client may be new and not yet registered with the particular agency represented by the caseworker, and therefore, the client's fingerprints may not be identifiable by any database maintained by that particular agency. Furthermore, even if the child's fingerprint image is in the agency's database, the placement may be new and may nonetheless require a new baseline data set, comprising scanned fingerprint images of (a) the child, (b) the assigned provider and (c) the assigned caseworker.

If the caseworker is conducting an emergency placement, or if a client is otherwise new, she or he can indicate to the fingerprint scanner 2 that the client is new, prior to scanning the client's fingerprint. In some embodiments of the fingerprint scanner 2, a caseworker can depress actuating member 18, labeled "New" in FIG. 2, before scanning the new client's fingerprint in accordance with steps (8) through (10) disclosed previously. Depressing that actuating member 18 can associate the client fingerprint image with a tag identifying the image as new, so that associated software within the computer 28 will regard the fingerprint as part of the establishment of a new baseline data set for a new placement. Also, if the provider is new, the caseworker can, and may be required to obtain an initial fingerprint scan from the new care provider. In this case, during fingerprint scanning of the assigned care provider, the caseworker can depress input member 18 ("New") prior to executing steps (5) through (7) above.

In various embodiments, after all desired new fingerprints have been scanned to establish all or a part of the new baseline data set for a new placement, the caseworker can depress the "complete" actuating member 20, indicating that the baseline data set is complete and thereby associating all of the newly acquired data within a visitation set for establishing the "new" baseline data (as previously identified as "new" using input member 18).

It is noted that emergency placements can involve circumstances where the baseline data discussed above is not fully acquired, nor even partially acquired, during a particular meeting or visitation. That is, the emergency situation may not be conducive to acquiring scanned fingerprint images of all, or any of the parties to the placement. However, a traditional intake procedure along with intake reports (discussed below) for the present invention, can serve as a double check to verify that all baseline data is acquired or to serve as a reminder or basis for requiring that a caseworker continue to make efforts to acquire the baseline data, in order to facilitate effective monitoring.

As will be appreciated by those skilled in the art after reviewing the present disclosure, one or more sets of computer implemented instructions (e.g., application programs, modules or components) can be provided on external computer readable medium (not shown) or on memory within the computer 28, to enable communication between the computer 28 and fingerprint scanner 2 via the docking station 24. Furthermore, such programs can be capable of being employed by a user to evaluate, categorize, organize, monitor and display data acquired through all or some of the methods and systems disclosed above.

A caseworker or user can upload data stored in the non-volatile writable memory 7 of the fingerprint scanner 2 onto a computer 28, the data comprising sequence numbers, date and time stamps and scanned images. A graphical user interface, or GUI, may be also be driven by the one or more programs and displayed on a display screen 30 of the computer 28. The GUI can have parameters for entering instructions via a keyboard 32 and graphical pictures or symbols, such as graphical buttons which a user can activate using an electronic pointer 34 (e.g., a "mouse") for initiating functions. The functions that can be initiated include uploading stored data from the fingerprint scanner 2 to the computer 28. In other embodiments, the communications between the computer 28 and fingerprint scanner 2 are initiated by firmware within either the fingerprints scanner 2 or docking station 24.

When an upload from the fingerprint scanner 2 to the computer 28 is complete and all stored data within the writable memory 7 is retrieved, the GUI, or other user interface, may prompt the user or caseworker to delete the writable memory of the fingerprint scanner 2. In some embodiments, the writable memory 7 is deleted only after confirmation by the caseworker, by manual verification that all data (including fingerprint images) acquired by the caseworker using the fingerprint scanner 2 has been property uploaded. In other embodiments, an automated self-check method or data verification algorithm is used, as will be understood by one skilled in the art after reviewing this disclosure, to detect if data has been altered or lost during transmission. This or other methods for automated checking of the integrity of transmitted data may be used along with instructions within the software within the computer 28 to automatically purge the writable memory 7 of the fingerprint scanner 2 after all sequence numbers, date and time stamps, fingerprint images and any association information within the writable memory 7 have been retrieved and verified.

In various embodiments of the present invention, caseworkers also independently track information regarding the number of fingerprints scanned and loaded into the fingerprint scanner 2 during visitations. The caseworker can then manually check the uploaded data against his/her own manually tracked records to ensure that all images have been uploaded as indicated by his records. Alternatively, the caseworker may be prompted by a program instruction in the computer 28 to enter information regarding the number of images to be uploaded from the fingerprint scanner 2 during, after or prior to uploading, and the program can then compare the actual number uploaded against the user entered number. If a discrepancy exists, the computer 28 can be instructed by the program to prompt the caseworker to re-initiate the upload.

The one or more computer implemented instructions or programs of the present invention can also be configured to be capable of generating reports, or "exception reports." For example, FIG. 5*a* shows an embodiment of a Visit Exception Report capable of being generated by software of the present invention in connection with the computer 28. The program examines the uploaded data from the fingerprint scanner 2 and compares the date and times stamps of the uploaded data against preprogrammed requirements. The requirements can comprise certain time ranges, specific dates or time intervals within which visits must occur between case workers and the providers and clients. For example, in some instances, applicable law can require monthly visits between and agency representative and a care provider and client. These monthly visit requirements can be preprogrammed within the computer 28 and the application program can be used to check or verify whether the agency has been compliant by comparing the uploaded data (i.e. including date/time stamps and images) against the visitation requirements. It is further noted that regular Visit Exception Reports can be generated automatically at given intervals or at the request of an agency administrator or other worker. The reports can display the results of the comparisons, including showing data associated with non-compliant comparisons.

FIG. 5a illustrates an embodiment of the visit exception report that can be generated by an embodiment of the present invention, showing clients names in column 40, the corresponding assigned staff for each client in column 42, the corresponding designated provider in column 44, the last recorded visits (according to uploaded data from the fingerprint scanners 2 used by assigned staff members) in column 46, and the days past compliance in column 48, which can be computed by comparing a date from a date/time stamp associated with the most recent uploaded visitation data for a particular client, against the required date of visitation. As will be appreciated by one skilled in the art after reviewing the present disclosure, the required date of visitation can be computed by, in general, adding a maximum number of allowable days between visits to the date of the last visit, the maximum number of allowable days between visits being fixed by statute, policy, or agency rule. The "Days Past Compliance" can then be calculated by comparing the numbers of days that have passed by to the last required visitation date without an associated visit, according to uploaded data from the fingerprint scanners 2 employed by assigned staff members.

In addition, some embodiments of the programs for the present invention also flag or indicate missing images, as shown in the "Missing Image Report" in FIG. 5b. In that "Missing Image Report," a fingerprint scanned image for a provider has been flagged as absent within the appropriate agency database. In this instance, an agency administrator could be alerted to the absence of this data to prompt a follow-up. The follow-up can include a requirement to promptly instruct an assigned caseworker to collect the missing image fingerprint (i.e., the "provider" image, in the illustrated embodiment in FIG. 5b) via all or some of the steps disclosed previously. In other embodiments, the "Missing Image Report" could also be an indication of a database flaw or error in data recording or transmission, which could be technically fixed, or require new data retrieval.

It is further noted that in some embodiments of the present invention, intake reports are generated. The intake reports can provide information to agencies informing them as to what data or baseline data is missing or remains to be collected for a particular placement or intake. The missing data can be fingerprint images necessary to establish baseline data usable for placement monitoring, or other party ID information required to be associated with the fingerprint images for monitoring or placement purposes. For example, in some embodiments, an agency manager or other employ can select to have an intake report generated by the application program executable on the computer 28. The intake reports can also be automatically generated by the application program in accordance with a preprogrammed schedule, such as, without limitation, daily, weekly or monthly. The intake report can identify unmatched fingerprint images that have been uploaded into the computer 28 via an incomplete intake, or can identify parties to an intake that do not yet have an associated fingerprint image. In either case, the application program can generate instructions in report form instructing persons to collect the missing data, or can allow the agency manager or employee to enter or upload the missing data. In the circumstance where the missing data is a fingerprint image, the intake report can be used to remind a caseworker to procure the missing fingerprint image immediately or as soon as possible. In other circumstances, the application program can be used to enter data intended to be associated with an unmatched fingerprint image, such as, without limitation, a client fingerprint image that was scanned as new, which has not yet been associated with particular placement identification information. The placement identification information can include the client's personal identification information combined with other vital information to the placement.

Figure 4B:
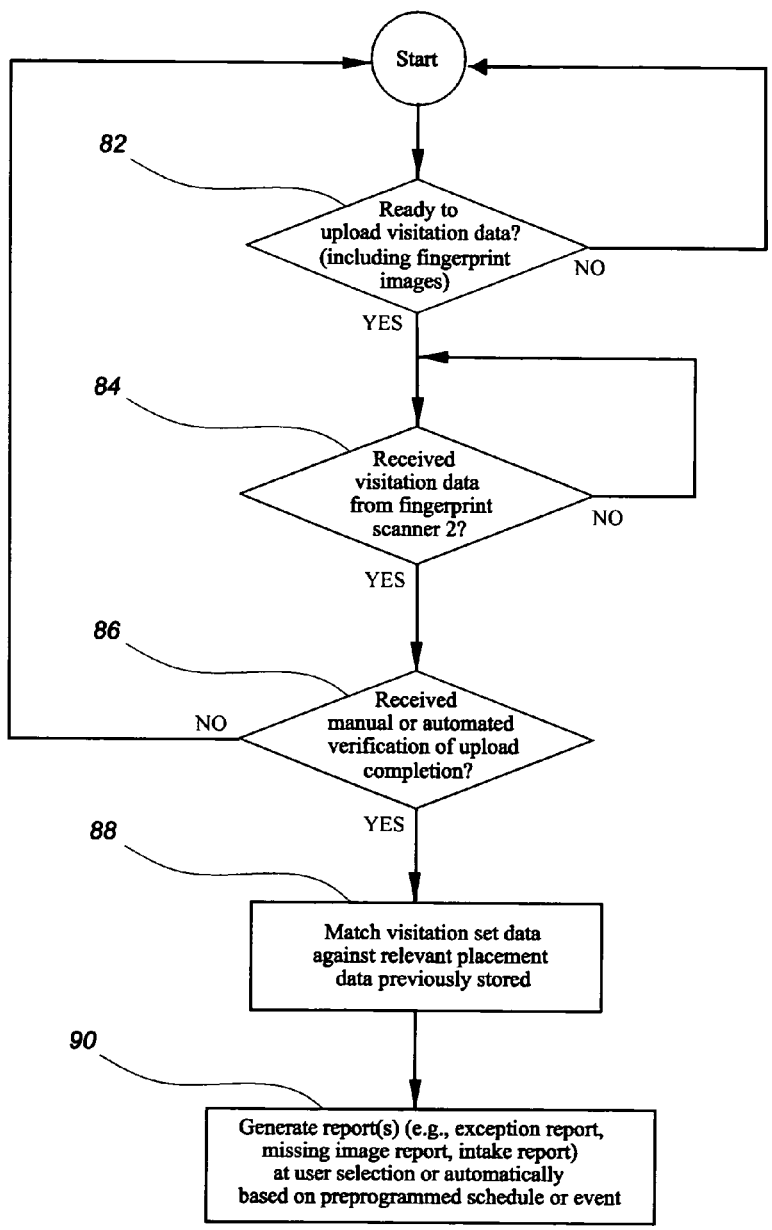
FIG. 4b is a flow chart of an embodiment of the present invention for using data from the fingerprint scanner of FIG. 2 for generating reports.

Referring to FIG. 4b, a flow sheet is shown of an embodiment of the present invention as implemented using a computer. At step 82, the computer 28 is ready to upload data (including images) from the fingerprint scanner 2 because of a user selection, or is automatically placed in an upload mode when the docking station 24 receives the fingerprint scanner 2. At step 84, the computer 28 can receive data from the fingerprint scanner 2. At step 86, the computer 28 can executed a data verification routine or the uploaded data can otherwise be manually verified by a user to help verify the integrity of the uploaded data, as described, supra. At step 88, the uploaded data, including visitation set data, is analyzed for a match against the relevant existing data for a placement residing on a memory of the computer 28 (e.g., baseline data) or a memory connected thereto, and relevant past tracking information for a particular case. At step 90, a report can be generated, such as an exception report, missing image report, or intake report, at the selection of a user, or based on a preprogrammed schedule or triggering event. Also, as those skilled in the art will appreciate after reviewing this disclosure, the various embodiments of reports can be generated independently of any particular data transfer process, such as that comprised in FIG. 4b, so that reports can be generated at any time, during, before or after receiving data from the fingerprint scanner 2.

It is also noted that the disclosed methods and systems, and their potential uses in placement monitoring, can be implemented as a compliment or supplement to existing monitoring methods. For example, in some embodiments, the application program discussed above can be configured to interface with an existing State Automated Child Welfare Information System (SACWIS), as will be appreciated by those skilled in the art after reviewing this disclosure. Such an interface can allow an agency to continue placement-monitoring using the SACWIS, while also double checking or verifying the placement monitoring using the fingerprint scanner 2 in combination with various embodiments of the programs described above.

Figure 7:
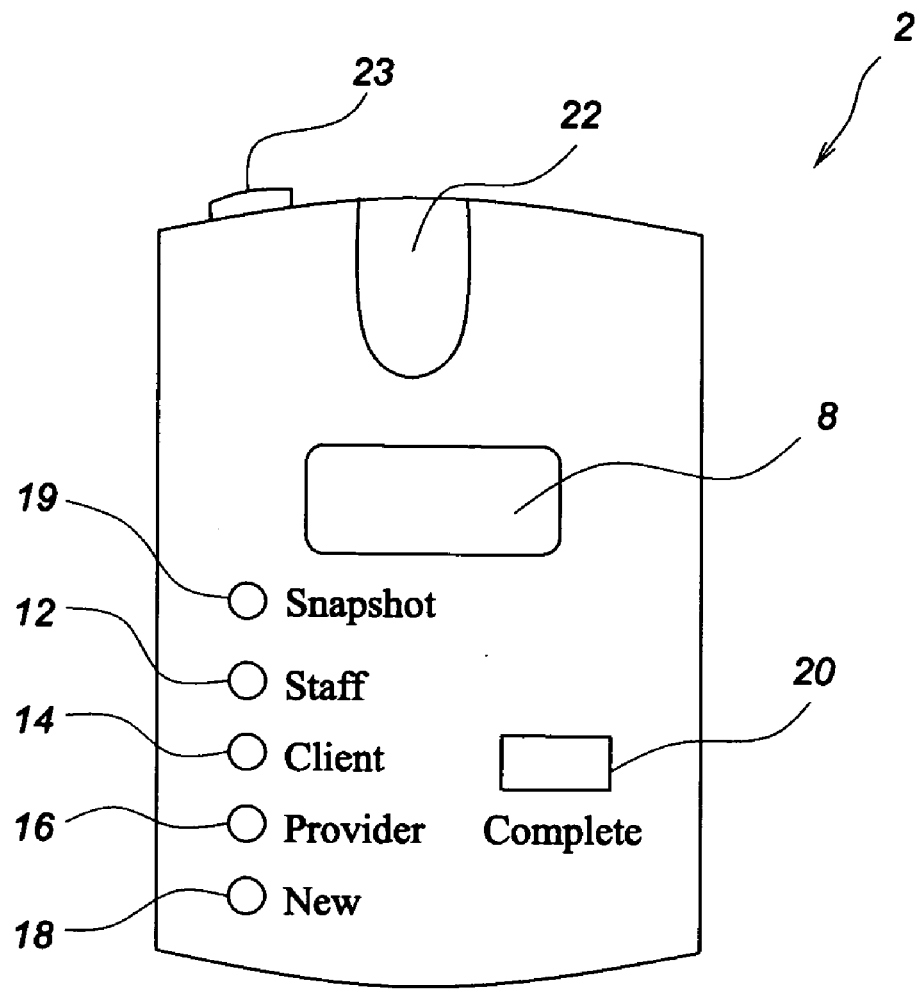
FIG. 7 is the embodiment of the fingerprint scanner of FIG. 2 further comprising an actuating member for actuating a camera.

It is further noted that in some embodiments of the present invention, caseworkers can be required or may use the camera system 3 to photograph images of one or more parties related to a placement during any of the various scenarios described previously. For example, if a fingerprint scan is not appropriate or feasible during an emergency intake, the caseworker could take a photograph using the camera system 3, and can later upload the photograph into the computer 28. In such embodiments, a "snapshot" button 19 and camera lens 23 can be provided on the fingerprint scanner 2, as best seen in FIG. 7. In some embodiments, the snapshot button 19 can be depressed after the staff 12, client 14, or provider 16 button is depressed, to capture a picture associated with a the particular party to a placement. As will be appreciated by those skilled in the art after reviewing the present disclosure, in some embodiments of the present invention, the described application program can include a component that allows the photographed images to be associated with corresponding data within the application program or its associated data base. For example, the photographed images, like a fingerprint image, can have an associated date/time stamp, sequence number, a data tag associating the photograph with a client, provider or staff category, and a data tag associating the photograph with a particular visitation set of data. That information associated with the photograph can be uploaded into the computer 28 such that the photograph can be used as an additional verification technique for verifying placement monitoring. That is, child welfare system agencies can view photographs along with any other data acquired through various embodiments of the present invention. The photographs can serve as a further verification of placement monitoring, or can serve as independent verification when other data is lacking.

Figure 8:
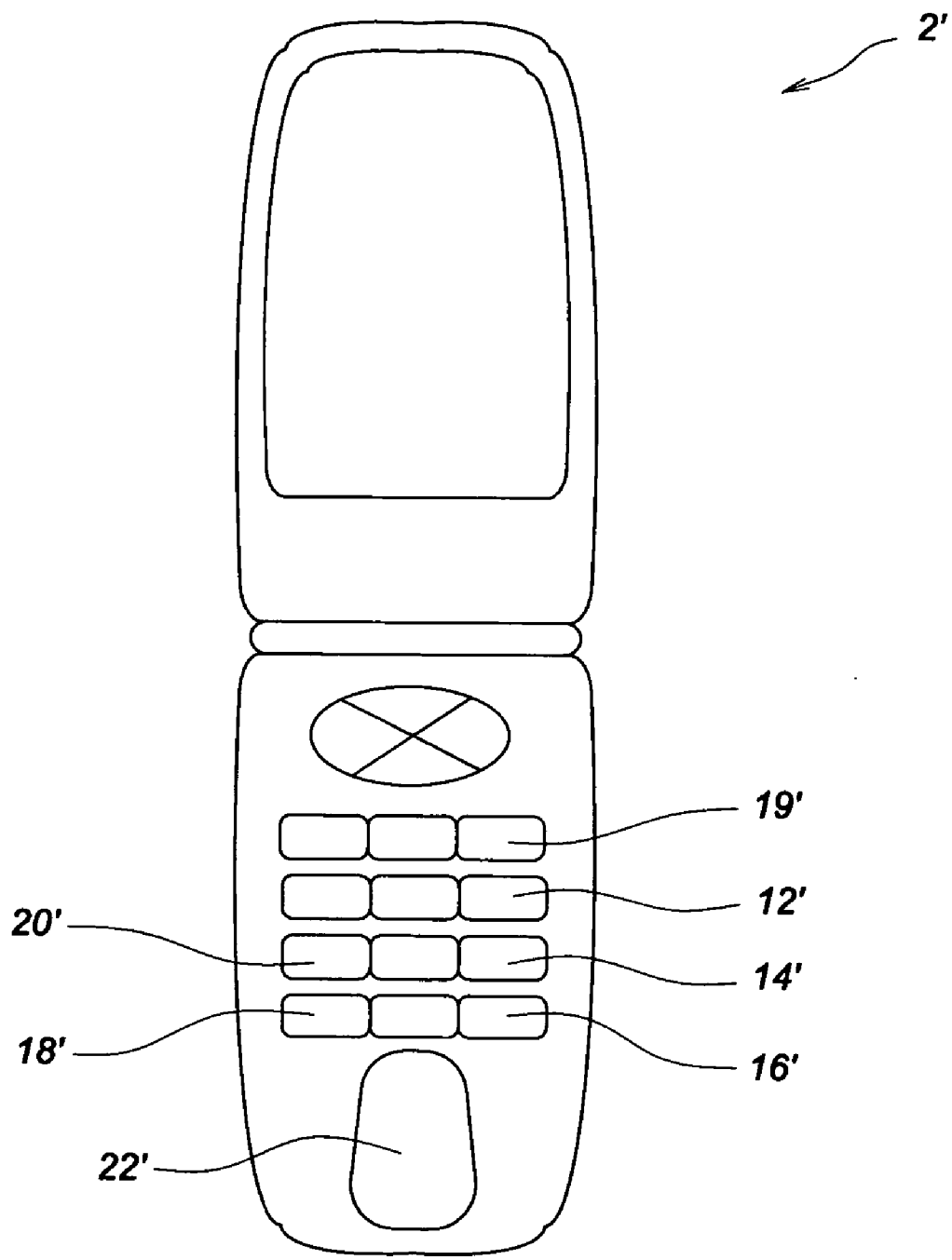
FIG. 8 is an embodiment of the fingerprint scanner of the present invention combined in a wireless phone.

Further embodiments of the present invention are provided in combination with wireless communications devices, such as a wireless phone 2', as shown in FIG. 8. The phone 2' can have same or similar input, storage and scanning capabilities as the fingerprint scanner 2, with scanning element 22'. Like the fingerprint scanner 2, the phone 2' can be equipped with input members 12', 14,' and 16' that can be associated with "staff," "client" or "provider" respectively, to allow fingerprint images to be stored with the correct association within a memory in the phone 2'. Also, input members 18', 20' can be provided to indicate when data is "new" and when a visitation set of data is complete. In some embodiments, a camera (not shown) is also provided on the phone 2' and an input member 19' is provided to operate the camera. As with the previously disclosed embodiments of the present invention, the camera can be used to compliment various monitoring programs. Furthermore, as will be appreciated by those skilled in the art upon review of this disclosure, wireless communications devices can also be used to transmit visitation set data wirelessly in lieu of using a docking station.

It is also noted that various embodiments of the software and methods disclosed related to computer based implementation of the methods, can include computer readable mediums, such as, but not limited to, CD's, floppy disks, DVD-ROM, flash memory systems, and another other computer readable medium containing the instructions to carry out the methods disclosed above and the equivalents thereof. Also, the user interfaces and displays disclosed, such as those illustrated for missing image reports, can also be presented as graphical user interfaces, as described.

Various embodiments of the present invention have been illustrated that provide new methods, apparatus and systems for monitoring and verify foster care placement, including monitoring and verifying quality and compliance with rule or policy. Furthermore, it is notable that with contributing factors such as high case loads and strained or minimal budgets, it has proven to be difficult for agencies or organizations to meet requirements for monthly face-to-face visitation with assigned case workers. Various embodiments of the present invention which identify missed visits thereby also mitigate, on an on going basis, the risk of subsequent and continued missed visitations.

Although specific embodiments and examples of the invention have been described supra for illustrative purposes, various equivalent modifications can be made without departing from the spirit and scope of the invention, as will be recognized by those skilled in the relevant art after reviewing the present disclosure. The various embodiments described can be combined to provide further embodiments. The described devices and methods can omit some elements or acts, can add other elements or acts, or can combine the elements or execute the acts in a different order than that illustrated, to achieve various advantages of the invention. These and other changes can be made to the invention in light of the above detailed description.

In general, in the following claims, the terms used should not be construed to limit the invention to the specific embodiments disclosed in the specification. Accordingly, the invention is not limited by the disclosure, but instead its scope is determined entirely by the following claims.

What is claimed is:

1. A method for verifying proper placement of a child in foster care and for monitoring the foster care using an image acquisition device, the method comprising:
   acquiring images associated with the child, at spaced apart intervals in time to generate a plurality of images;
   acquiring images associated with at least a guardian and caseworker at each of the spaced apart intervals in time;
   comparing, using a processor, the images against stored images; and
   generating reports as a function of each of the plurality of images collected and results of the comparison of the images against said stored images.

2. The method of claim 1 using a fingerprint scanner to generate the images and to store an associated time or date with each fingerprint image acquired.

3. The method of claim 2 further comprising comparing the times or dates against predetermined times or dates.

4. The method of claim 3 wherein the predetermined times or dates are visitation deadlines for staff members.

5. The method of claim 4 further comprising generating a report to display a time or number of days by which any one of said times or dates exceeds at least one of said predetermined times or dates.

6. The method of claim 1 further comprising storing the images within a memory of a portable image acquisition device and also associating at least one of the fingerprint images with a sequence number.

7. The method of claim 1 wherein the image acquisition device is combined within a wireless communications device.

8. The method of claim 7 wherein the wireless communication device is a phone.

9. The method of claim 1
   wherein the acquired images are fingerprint images and comparing the images against stored images comprises determining whether stored fingerprint images match the fingerprint images; and
   wherein generating reports comprises using the computer to generate reports to verify matches between the stored fingerprint images and the fingerprint images.

10. A computer implemented method for verifying proper placement of a child in foster care and for monitoring the foster care using an image acquisition device, the method comprising:
   acquiring images associated with the child, at spaced apart intervals in time to generate a plurality of images;
   acquiring at least one image associated with a guardian at each of the spaced apart intervals in time;
   acquiring at least one image associated with a caseworker at each of the spaced apart intervals in time;

comparing, using a processor, each of the images against at least one of a plurality of baseline images, wherein the baseline images include at least an image associated with each of the child, guardian and caseworker;

generating reports as a function of comparing the images against the baseline images; and wherein during an initial placement, at least one of the baseline images is not collected for at least the child or guardian, and wherein a report is thereafter generated, using a computer, indicating a missing image, and identifying the missing image as an image associated with the child or guardian.

11. The computer implemented method of claim 10 wherein the missing image is the results of a technical problem associated with the computer or an associated database.

* * * * *